United States Patent
Bourrieres et al.

(10) Patent No.: US 7,380,128 B2
(45) Date of Patent: May 27, 2008

(54) METHOD AND DEVICE FOR READING AUTHENTICATION MEANS AND ADAPTED IDENTIFICATION MEANS

(75) Inventors: Francis Bourrieres, Montauban (FR); Clement Kaiser, Montauban (FR)

(73) Assignee: Novatec SA, Montauben (FR)

( * ) Notice: Subject to any disclaimer, the term of this patent is extended or adjusted under 35 U.S.C. 154(b) by 861 days.

(21) Appl. No.: 10/182,967

(22) PCT Filed: Feb. 2, 2001

(86) PCT No.: PCT/FR01/00322

§ 371 (c)(1),
(2), (4) Date: Aug. 1, 2002

(87) PCT Pub. No.: WO01/57831

PCT Pub. Date: Aug. 9, 2001

(65) Prior Publication Data

US 2003/0014647 A1     Jan. 16, 2003

(30) Foreign Application Priority Data

Feb. 4, 2000   (FR)   .................................. 00 01403
Mar. 13, 2000  (FR)   .................................. 00 03148
Oct. 9, 2000   (FR)   .................................. 00 12860

(51) Int. Cl.
   *H04K 1/00*   (2006.01)
(52) U.S. Cl. ...................... 713/185; 713/182
(58) Field of Classification Search ................ 713/185, 713/182

See application file for complete search history.

(56) References Cited

U.S. PATENT DOCUMENTS

| 5,021,072 | A * | 6/1991 | Atkins et al. .................. 65/423 |
| 6,269,169 | B1 * | 7/2001 | Funk et al. .................. 382/100 |
| 6,447,976 | B1 * | 9/2002 | Dontula et al. ............. 430/201 |
| 6,512,580 | B1 * | 1/2003 | Behringer et al. .......... 356/244 |
| 6,584,214 | B1 * | 6/2003 | Pappu et al. ................. 382/108 |
| 2003/0118191 | A1 * | 6/2003 | Wang et al. ................. 380/285 |
| 2004/0112962 | A1 * | 6/2004 | Farrall et al. .......... 235/462.01 |

FOREIGN PATENT DOCUMENTS

| GB | 2 304 077 | 3/1997 |
| GB | 2 324 065 | 10/1998 |
| WO | 00 10114 | 2/2000 |

* cited by examiner

*Primary Examiner*—Kambiz Zand
*Assistant Examiner*—Jacob Lipman
(74) *Attorney, Agent, or Firm*—Vidas, Arrett & Steinkraus

(57) ABSTRACT

This invention involves a reading process for three-dimensional means of identification (100) that are unique and non-reproducible (100), containing a mixture of at least two materials (110 and 120) that are distinguishable from one another (110 and 120), remarkable in that it consists of one part to recognize the internal heterogeneous structure of the means of identification (100) in two dimensions, and another part to verify and prove its third dimension to render falsification impossible. This characteristic reduces the amount of storage memory as well as the length of time necessary to perform the operations of reading, acquisition, and comparison usually conducted in such processes. The invention also involves a device that implements said process as well as a means of identification adapted to said process.

6 Claims, 4 Drawing Sheets

METHOD AND DEVICE FOR READING AUTHENTICATION MEANS AND ADAPTED IDENTIFICATION MEANS

FIELD OF THE INVENTION

The application of this invention is for the identification and authentication of objects, living creatures, and transactions, and for adaptations to optimize the reading of non-reproducible means of identification.

BACKGROUND OF THE INVENTION

All creatures, all goods, and all transactions must be associated with a definite identity. These same creatures, goods, and transactions will then be referenced by that identity when there is a need to authenticate their identification. In the past, and today more than ever, unscrupulous people seek to counterfeit either the products or their associated identities. Likewise, although it is impossible to counterfeit living creatures, it is possible that their identity can be falsified or usurped as needed.

Today there exist many unique and non-reproducible methods of identification. For example, the means of identification described in patent GB 2 304 077 consists of an assortment of reflective particles distributed in three dimensions in a support material, said particles reflecting from a light source an assortment of rays at different angles to create a unique signature of reflected light that can be detected by a reading method.

It is true that a random, three-dimensional arrangement of heterogeneous material guarantees the uniqueness and non-reproducibility of a means of identification. Nevertheless, storing these different signatures and reading and comparing them in order to guarantee such qualities are a very complex process. Such a means of identification must be unable to be falsified in order to guarantee the authenticity and security of its associated goods and services. In addition, there is also a risk that the slightest variation in the relative position of the incidental lighting, the receiver, and the means of identification will be enough to generate a different signal. As a result, it is almost impossible to construct two identical readers. Large-scale use of such a means of identification and its reading method would slow down transactions considerably, serving as a barrier to its use. It is also possible to trick such a device, thereby rendering it useless. All that is necessary is to have access to the various signatures in order to present photocopies of them to the reading device.

Storing a group of luminous signatures of a means of identification requires a large number of bytes, and comparison of one of these signatures to the recorded group can take hours with today's methods of communication. This reading method allows falsification since it only interprets images projected on a plane, even though they are generated three-dimensionally.

Another means of identification is described in patent GB 2 324 065. This method also offers a three-dimensional guarantee of uniqueness and non-reproducibility. However, the means of identification described in that document consists of first and second distinct elements, the second element being fixed and positioned randomly inside the first, with the position of the second element in relation to the first forming an identification code. Rather than translating the position of the first element in relation to the other into code, it is possible to utilize a standard analysis of the pattern formed by the heterogeneous items in the interior of a transparent material.

Nevertheless, this reading method can be deceived since the image that is analyzed consists of a two-dimensional image, the reader not utilizing its full three-dimensional structure. Therefore, the third dimension or the three-dimensional geometry is the guarantor of uniqueness and non-reproducibility, but the reading method can be deceived since it does not take into account the three-dimensional nature of the means of identification. However, even if the reading or coding could be conducted on the totality of the volume, the number of possibilities would create the same problems already described above in that the reading, storage, and comparison would become such lengthy operations that this authentication solution could not really be exploited on a grand scale.

The three-dimensional nature of this type of means of identification, which is composed of measurable heterogeneous items distributed randomly in a support material, guarantees uniqueness and non-reproducibility, since the random arrangement is difficult to reproduce in three dimensions. Moreover, it is not possible to reproduce a layout that is itself embedded in the material without modifying said layout.

SUMMARY OF THE INVENTION

Based on this fact, the applicant researched an optimized process for reading a unique and non-reproducible authentication method based on volume. This research led to the design of a reading process for means of identification containing bubbles that is particularly new and inventive.

According to the invention, the reading process for a unique and non-reproducible means of identification consisting of a mixture of at least two distinct materials forming a transparent matrix is remarkable in that it consists of one part to identify the internal heterogeneous structure of said means of identification in two dimensions, and another part to detect and determine its third dimension.

This characteristic is particularly advantageous in that it breaks down the procedure into two operations, greatly simplifying the reading and acquisition while still guaranteeing authenticity.

It is a recognized fact that the third dimension guarantees the uniqueness and non-reproducibility of a means of identification containing heterogeneous material when it is subjected to a reader. Likewise, it is well known that a random arrangement of one material in relation to another, the two materials being distinguishable from one another, constitutes a code. Consequently, the applicant has devised a reading process consisting of recording and reading the means of identification in two dimensions and then confirming its three-dimensional nature without the possibility of falsification of said means of identification during these operations. It is no longer necessary to store all of the luminous or other type of signatures for a means of identification as was required by earlier reading processes, or all the signatures that verify the three-dimensional nature of the means of identification in order to avoid falsification. Only one two-dimensional representation, generated by submitting to diffuse lighting, suffices for recognition and coding of the means of identification, its storage therefore becoming less problematic and comparison of the images becoming a very rapid operation. This operation is then immediately followed, without moving the means of identification, by submission to direct lighting, which generates a shadow and thus attests to its authenticity.

Another goal of the invention is to provide a way to create a device utilizing said reading process. This device is particularly suited for a means of identification containing bubbles.

Another goal of the invention is to provide a means of identification adapted to and optimized for this reading process.

The fundamental concepts of the invention have been described above in their most elementary form. Other details and characteristics will arise more clearly from reading the description that follows and from the attached diagrams.

DETAILED DESCRIPTION

Figure 1:
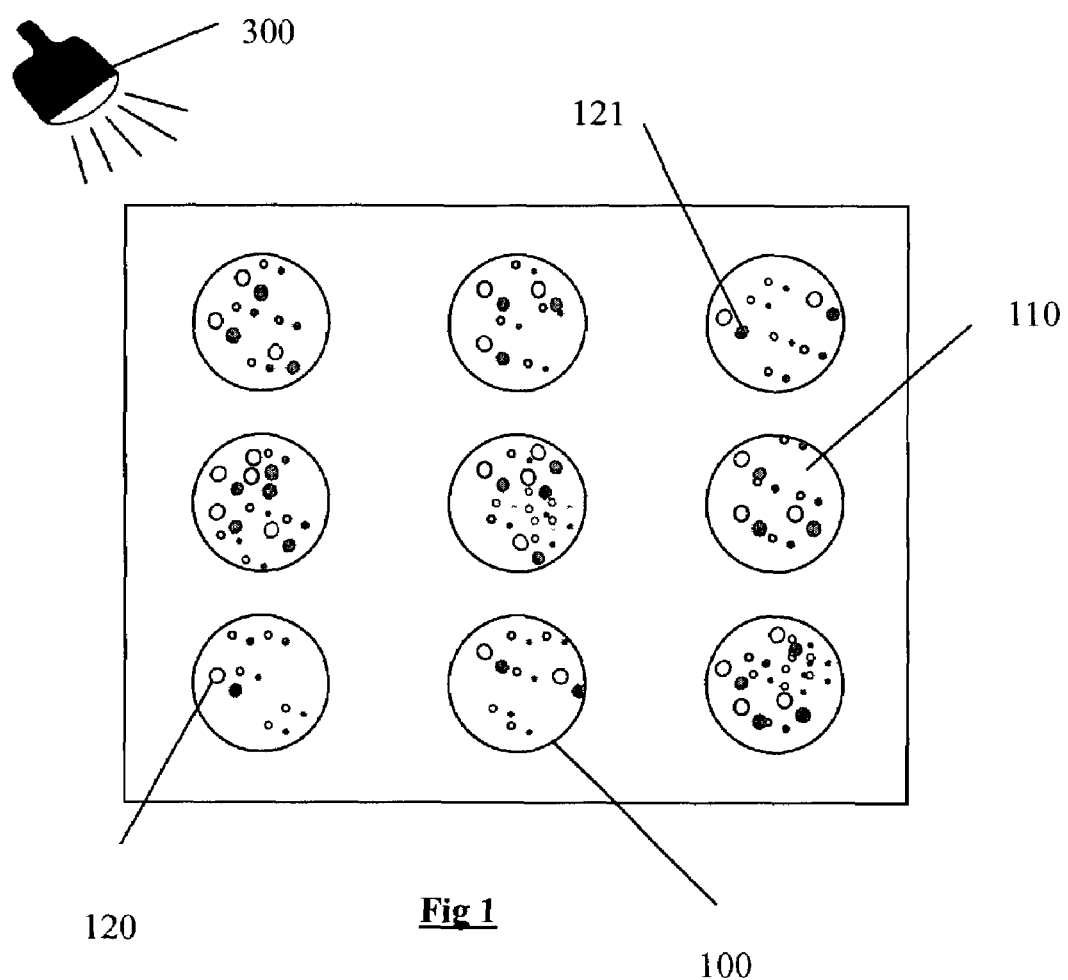
FIG. 1 is a schematic diagram of a top view of an assortment of means of identification subjected to the invention's reading process.
Figure 2A:
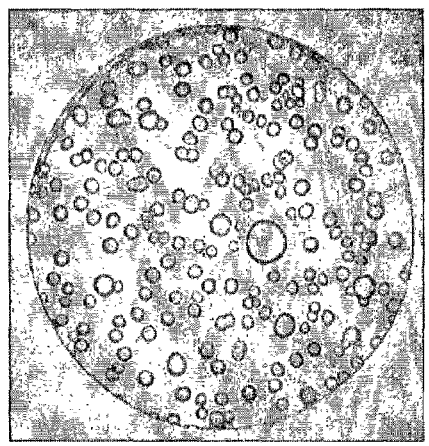
FIGS. 2a and 2b are photographs of a top view of the means of identification illustrating the results of the invention's process.
Figure 2B:
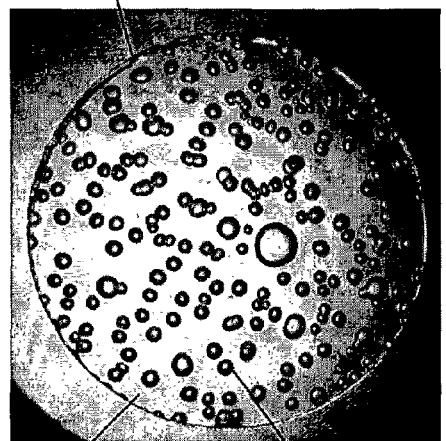
Figures 3A, 3B:
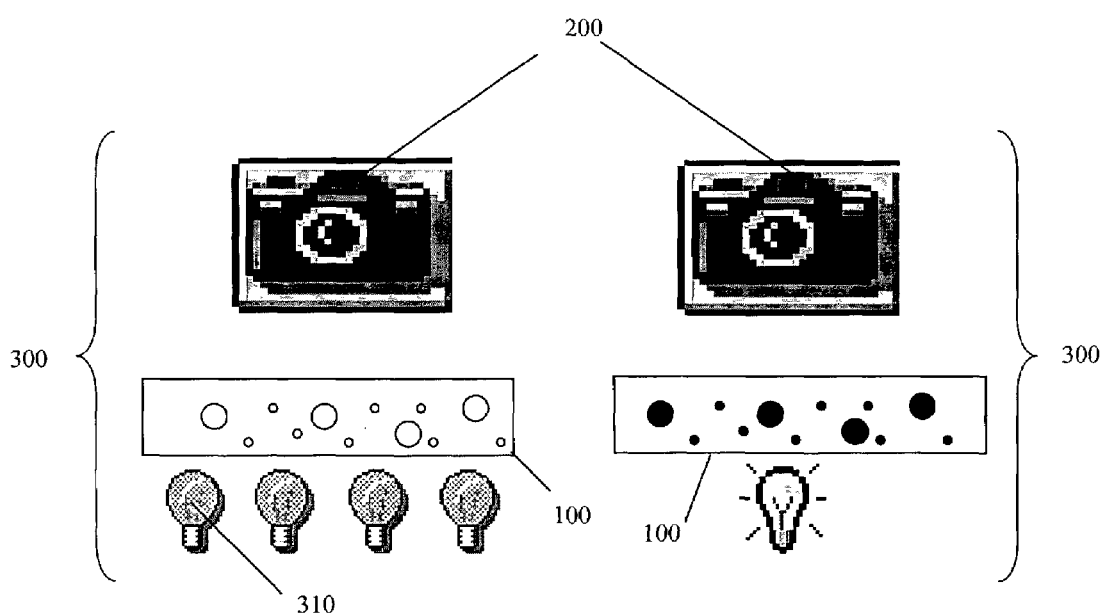
FIGS. 3a and 3b are schematic diagrams of a device implementing the two operations comprising the invention's process with lighting from the lower part and acquisition from the top.

As illustrated in the diagrams of FIGS. 1, 2a, and 2b, the unique and non-reproducible means of identification referred to in its entirety as 100 includes a transparent hardened mixture 110 and an assortment of bubbles 120. As illustrated in the diagrams of FIGS. 3a and 3b, the means of identification has a third dimension that guarantees its uniqueness and authenticity.

According to the invention, the reading process consists of first recognizing the internal heterogeneous structure of the means of identification in two dimensions and then verifying the third dimension. According to the first method of implementation illustrated in FIG. 1, the process is marked by verifying the three-dimensional arrangement of the layout of material 120 contained in the means of identification by analyzing the shadows 121 generated by said materials 110 and 120 from the angle of incidence of a light 300 relative to the means of identification 100. This solution is remarkable in that it proposes a particularly simple verification of the three-dimensional structure. Therefore, within the framework of an application based on a means of identification containing bubbles, the mere presence of shadows below the bubbles or in the axis that they form with the light source guarantees that the bubbles are arranged in three dimensions. This information, in conjunction with the recognition in two dimensions of the means of identification, allows a reading process that cannot be falsified and is particularly rapid.

Using the specific and preferred option of bubbles, the applicant moreover devised another advantageous characteristic of the process in that it consists of reading and verifying the three-dimensional layout of the bubbles contained in the means of identification through successive and immediate subjection of said means of identification to diffuse lighting, making it possible to obtain a two-dimensional projection of the outlines of the bubbles to allow their reading and coding, then to direct lighting, generating a reflection on the interface that separates the heterogeneous material from the transparent product, therefore proving its three-dimensional aspect and thus its authenticity. These two successive lightings are done automatically in a very short time with the means of identification in a fixed position to make it impossible for any manipulation intended to deceive the reader, such as presenting a two-dimensional shadow picture immediately after the first acquisition. This aspect is illustrated in FIGS. 3a and 3b where the means of identification 100 is subjected to the diffuse lighting in FIG. 3a, then to the direct lighting illustrated in FIG. 3b, the means of identification being the object of acquisition for reading or recording by an unspecified acquisition device 200, depicted here by a digital photographic device.

The result of this successive subjection to different lightings appears in FIGS. 2a and 2b, where it is easy to note the emphasis on the three-dimensional structure of a means of identification containing bubbles 120 by the different reflections that they cast in relation to different lighting. Indeed, because of their translucent structure, bubbles permit either diffuse or direct axial lighting, thereby simplifying the reading process and its implementation. The acquisition method only has to compare the two images locally to verify that the same bubbles 120 in fact produced the different reflections. Therefore, because of another especially advantageous aspect of the invention, the process is remarkable in that it emphasizes the three-dimensional aspect of the means of identification by analyzing the forms reflected by the bubbles 120 contained in the means of identification based on lighting. The application of the invention's reading process to a means of identification containing bubbles constitutes an innovation on prior methods since the source of light does not change but rather the nature of the light, conveying different information rather than a new luminous signature. This is different from prior methods, which varied luminous flows in order to acquire new luminous signatures to prove the three-dimensional nature of the means of identification and thereby to recognize it, which can very easily be falsified since there is no concept of time between two successive acquisitions.

Simultaneously, or at least successively, the two-dimensional image of the means of identification is compared with those stored during its manufacture. This comparison will take place locally, in other words by the reader or by a microprocessor that can be included in it. Once the means of identification has been recognized, the transaction (assuming it is a transaction-type application) can be concluded. In such a case, the coding of the means of identification can be contained in a secret part of a microchip that is linked to said means of identification.

Of course, when the two-dimensional image is recognized and the third dimension of the means of identification 100 is not present, the transaction would not be authorized and the means of identification would be seized, as would also happen when the two-dimensional image is different from that on record.

In order to speed up the reading process, the means of identification 100 can contain a call sign readable by the acquisition method that will be provided during the authentication request, or a secret code giving access to a local or remote database.

The diagrams in FIGS. 3a and 3b illustrate a particularly advantageous device referenced as 300 that implements this process. This device 300 is remarkable in that it contains a sloped lighting surface containing bulbs, here shown as 310, where all the bulbs can be lighted to create diffuse lighting on the means of identification 100, and then one single bulb is lighted to create direct lighting on means of identification 100. The advantage of this method of implementation is that it offers a different lighting solution, yet one that is very simple and easy to implement, using device 300 as a base.

Figure 4A:
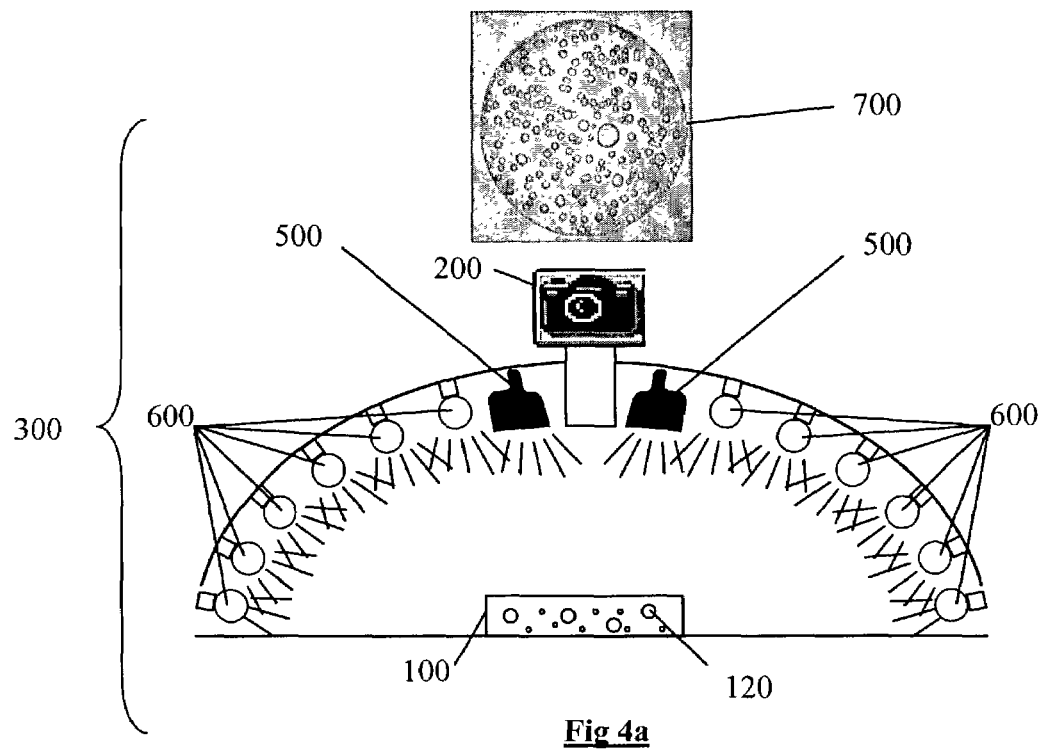
FIGS. 4a and 4b are schematic diagrams of a device implementing the two operations comprising the invention's process with lighting and acquisition from the same side.
Figure 4B:
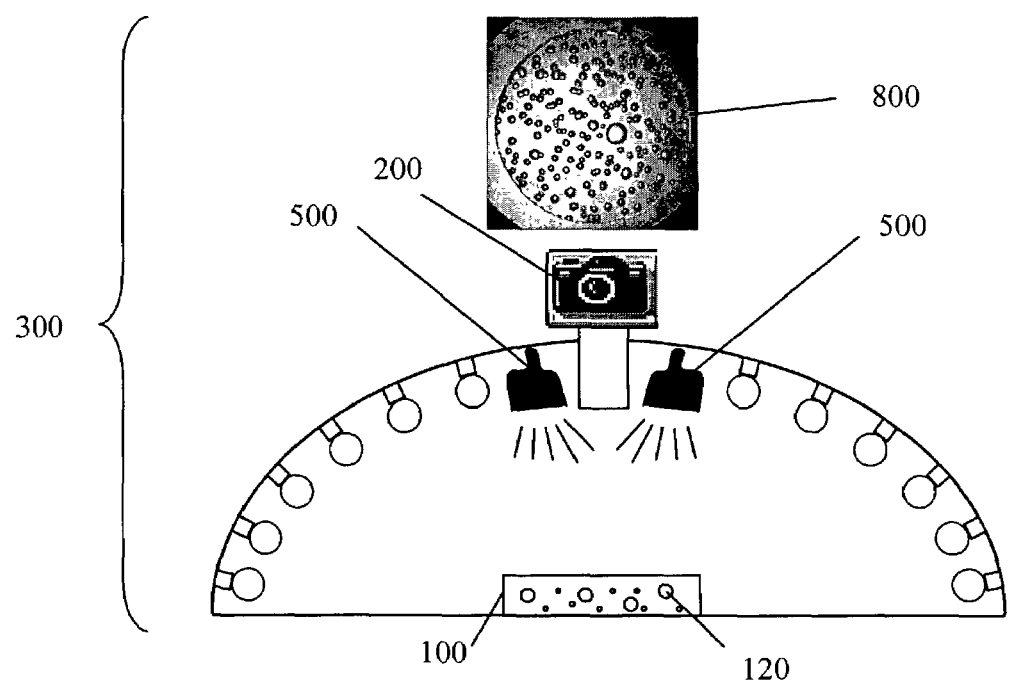

The diagrams in FIGS. 4a and 4b illustrate another method of implementation where the means of identification 100 is decoded and authenticated by the reader and successive lights located on the same side. In 4a, lamps 600 and 500, placed on the periphery of a dome, are lighted together to provide diffuse lighting to allow acquisition method 200 to determine the contours of the coding elements. Under this lighting, acquisition method 200 provides a well-defined image of the contours as is represented by 700. This is followed immediately and without delay by the lighting represented in 4b where lamps 600 are dark and lamps 500 provide direct lighting to create a shadow of the coding elements to verify the authenticity of the means of identification. Under this lighting, acquisition method 200 provides an image of the bubble shadows projected on the interface as is represented by 800.

Another focus of the invention is embodied by a means of identification adapted to the invention process. In this instance, the applicant has designed a means of identification containing bubbles 100 that are not the result of a particular mixing process in order to ensure the non-reproducibility of such a means of identification even when an identical mixture of the materials occurs. The means of identification devised by the applicant is remarkable in that it consists of a transparent material where the bubbles have been self-generated by treatment with heat during the hardening of said transparent material. Therefore, the means of identification does not result from a mixture but from self-generation, which cannot be controlled and subsequently reproduced.

The reading process for a means of identification, the device implementing it, and the means of identification adapted to and optimized for this process that were described and represented above are not its only uses. Its industrial applications are numerous, a few of which possibilities are:

protection against counterfeiting in any form (luxury items, art objects, antiquities . . . ), positive identification for individuals carrying identity cards, passports, driver's licenses, or any other official document, positive identification for transactions conducted by magnetic or smart cards and banknotes, positive traceability for foodstuffs and any potentially destructive items, positive identification for animals protected for human consumption or in the wild, access control for private residences, public places, and high-security areas.

The invention claimed is:

1. Reading process for a three-dimensional means of identification (100) containing a mixture of at least two materials (110 and 120) that can be distinguished from one another (110 and 120) in the form of a transparent matrix containing bubbles, the process comprising one step to recognize the heterogeneous internal structure in two dimensions of said means of identification (100) and another step to verify and prove its third dimension characterized by reading and verifying the three-dimensional layout of the bubbles (120) contained in the means of identification (100), these bubbles (120) including members that had been self-generated during the hardening of said transparent material (110), by submitting said means of identification (100) successively and immediately, while the means of identification is maintained in a fixed position, to different lightings to determine by a diffuse lighting a random two dimensional pattern of the bubbles (120), thereby allowing them to be read and coded, and to confirm by a direct lighting from the same lighting sources the three dimensional aspect of the identification means.

2. Process according to claim 1, characterized by verifying the three-dimensional layout of the materials (110 and 120) contained in the means of identification (100) by analyzing the shadows (121) generated by said materials (110 and 120) as a factor of the angle of incidence of said direct light source in relation to said means of identification (100).

3. Process according to claim 1 wherein said bubbles define interfaces with the transparent matrix, characterized by reading and verifying the three-dimensional layout of the bubbles (120) contained in the means of identification (100) by submitting said means of identification (100) successively to said diffuse lighting then to said direct lighting generating a reflection (800) on the interface separating the bubbles from the transparent matrix (110), thereby proving its three-dimensional aspect.

4. Process according to claim 1, characterized by verifying the three-dimensional layout (800) of the means of identification (100) by analyzing the reflected shapes of the bubbles (120) contained in the means of identification (100) caused by said direct lighting.

5. A device (300) for implementing the process according to claim 1, characterized in that it comprises a ramp containing light sources (310) that go from a state in which all the lights (500 and 600) are illuminated in order to create said diffuse lighting, to a state where only one light (500) is illuminated in order to create said direct lighting.

6. Process according to claim 1, wherein said different lightings are provided by a ramp containing light sources (310) that go from a state in which all the lights (500 and 600) are illuminated to create said diffuse lighting, to a state where only one light (500) is illuminated to create said direct lighting.

* * * * *